United States Patent
Luczynski et al.

(10) Patent No.: US 10,645,173 B2
(45) Date of Patent: May 5, 2020

(54) SESSION HANDLING FOR MULTI-USER MULTI-TENANT WEB APPLICATIONS

(71) Applicant: International Business Machines Corporation, Armonk, NY (US)

(72) Inventors: Marcin Luczynski, Cracow (PL); Jonathan Rabe, Boeblingen (DE); Isabell Sippli, Metzingen (DE); Sebastian E. Wegmann, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 15/797,968

(22) Filed: Oct. 30, 2017

(65) Prior Publication Data

US 2019/0132397 A1 May 2, 2019

(51) Int. Cl.
*H04L 29/08* (2006.01)
*H04L 29/06* (2006.01)

(52) U.S. Cl.
CPC ............ *H04L 67/141* (2013.01); *H04L 63/08* (2013.01); *H04L 63/0815* (2013.01); *H04L 63/102* (2013.01); *H04L 67/146* (2013.01); *H04L 67/10* (2013.01)

(58) Field of Classification Search
CPC ..... H04L 67/141; H04L 67/146; H04L 67/10; H04L 63/08; H04L 63/0815; H04L 63/102
See application file for complete search history.

(56) References Cited

U.S. PATENT DOCUMENTS

| | | | |
|---|---|---|---|
| 9,218,428 B2 | 12/2015 | Reddy et al. | |
| 2011/0083083 A1* | 4/2011 | Kurumai | G06F 16/9577 715/744 |
| 2012/0144024 A1 | 6/2012 | Lee | |
| 2015/0188900 A1 | 7/2015 | Charbonneau et al. | |
| 2016/0028833 A1* | 1/2016 | Georgieva | H04L 67/146 709/228 |
| 2018/0191701 A1* | 7/2018 | Kong | H04L 63/0853 |

OTHER PUBLICATIONS

Guy A, "Sharing sessionStorage between tabs for secure multi-tab authentication," Blog post on Javascript and Security, Jun. 12, 2015, 7 pages, accessed Dec. 17, 2016. https://blog.guya.net/2015/06/12/sharing-sessionstorage-between-tabs-for-secure-multi-tab-authentication/.

Kuppusamy et al., "Design and Development of Multi-Tenant Web Framework," International Conference on Intelligent Computing, Communication & Convergence (ICCC 2015,) Procedia Computer Science vol. 48, 2015, pp. 180-191.

* cited by examiner

*Primary Examiner* — Austin J Moreau

(74) *Attorney, Agent, or Firm* — Yee & Associates, P.C.

(57) ABSTRACT

A method for managing access to a web application. A request is received, by a computer system, including a tenant identifier for a tenant within a universal resource locator for the web application on a server in the computer system from a browser. A set of session cookies for the web application from the browser is received, by the computer system, wherein the set of session cookies has tenant identifiers and session identifiers. A session cookie in the set of session cookies corresponding to the tenant identifier within the universal resource locator as a selected session cookie is selected, by the computer system, when the session cookie corresponding to the tenant identifier is present in the set of session cookies. The selected session cookie is used, by the computer system, to handle the request.

20 Claims, 9 Drawing Sheets

US 10,645,173 B2

SESSION HANDLING FOR MULTI-USER MULTI-TENANT WEB APPLICATIONS

BACKGROUND

1. Field

The disclosure relates generally to an improved data processing system and, more specifically, to a method, apparatus, and computer program product for handling sessions for multiple users and multiple tenants accessing a web application.

2. Description of the Related Art

Increasingly, web applications are designed such that a single instance of a web application runs on a server and is accessed by multiple groups of users. Each of these groups is a tenant. Each tenant may have different privileges and access to different collections of data. A tenant can be a business, a department, a location, or some other organization or group. A single business can have multiple tenants, multiple businesses can be tenants in a group of tenants, or some combination thereof. With this architecture, each tenant has a dedicated share of the instance of the web application.

A user may belong to multiple tenants. This situation can occur, for example, when an employee works on different projects at a company. The employee is a user and each project may be a tenant.

For web applications, session information is usually stored in hypertext transfer protocol (HTTP) cookies. This session information in these cookies includes, for example, session identifiers and other information that may be relevant to the session. Each cookie is stored for a specific domain for the web application. As a result, multiple browser tabs in a browser can be used to access the same session, and the session can even be maintained for a long period of time, thus reducing the need to login with the web application again.

However, for users belonging to multiple tenants, it is desirable to maintain a session for each tenant in parallel to avoid the need of logging in again for every context switch. Currently, a tab-based session storage can be used for different tenants. The session information can be stored in a HTML 5 SessionStorage, which is specific to one browser tab. With this system, independent sessions can be maintained in different browser tabs. However, with this system, it is not possible to use an already-existing session in an additional browser tab. In case a second tab is required for an already existing session, the user is asked to login a second time.

Another system includes forwarding the session identifier in the universal resource locater (URL) instead of using cookies. With this system, the web application attaches the session identifier to each internal link and can therefore prevent the need to login again as long as only these internal links are used. Several sessions can be maintained in different browser tabs, even with some sessions being used in multiple browser tabs. However, the session identifiers are considered sensitive information. Further, unlike cookies, sessions cannot be maintained during browser shut-downs.

In yet another system, the user can manually maintain several cookie stores. These cookie stores may be maintained, for example, by using different browsers or private windows for different sessions. This system, however, requires additional effort by the user.

SUMMARY

According to one embodiment of the present invention, a method for managing access to a web application is present. A request is received, by a computer system, including a tenant identifier for a tenant within a universal resource locator for the web application on a server in the computer system from a browser. A set of session cookies for the web application from the browser is received, by the computer system, wherein the set of session cookies has tenant identifiers and session identifiers. A session cookie in the set of session cookies corresponding to the tenant identifier within the universal resource locator as a selected session cookie is selected, by the computer system, when the session cookie corresponding to the tenant identifier is present in the set of session cookies. The selected session cookie is used, by the computer system, to handle the request.

According to another embodiment of the present invention, a web application system comprises a computer system and a web application running on the computer system. The web application receives a request including a tenant identifier for a tenant within a universal resource locator for the web application on a server in the computer system from a browser over a network. The web application receives a set of session cookies for the web application from the browser, wherein the set of session cookies has tenant identifiers and session identifiers. The web application selects a session cookie in the set of session cookies corresponding to the tenant identifier within the universal resource locator as a selected session cookie when the session cookie corresponding to the tenant identifier is present in the set of session cookies. The web application uses the selected session cookie to handle the request.

According to yet another embodiment of the present invention, a computer program product for managing access to a web application comprises a computer-readable storage media, first program code, second program code, third program code, and fourth program code. The first program code, stored on the computer readable storage media, receives a request including a tenant identifier for a tenant within a universal resource locator for the web application on a server in the computer system from a browser. The second program code, stored on the computer readable storage media, receives a set of session cookies for the web application from the browser, wherein the set of session cookies has tenant identifiers and session identifiers. The third program code, stored on the computer readable storage media, selects a session cookie in the set of session cookies corresponding to the tenant identifier within the universal resource locator as a selected session cookie when the session cookie corresponding to the tenant identifier is present in the set of session cookies. The fourth program code, stored on the computer readable storage media, uses the selected session cookie to handle the request.

DETAILED DESCRIPTION

Figure 1:
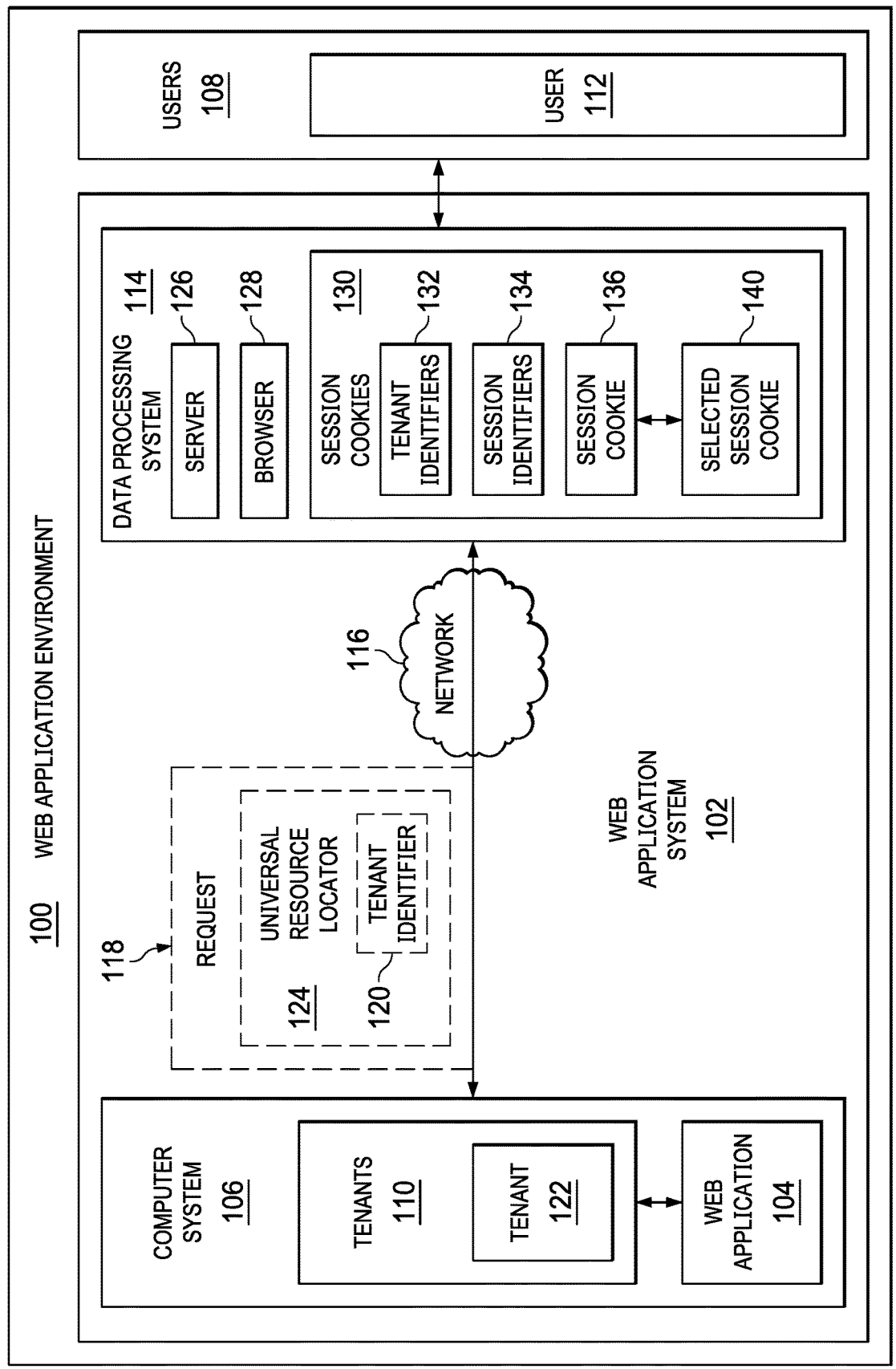
FIG. 1 is a block diagram of a web application environment in accordance with an illustrative embodiment.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or an external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that current users of weather applications that support multiple tenants can have a challenge in maintaining a session for each tenant in parallel such that logging in again for every context switch can be reduced or avoided. Thus, the illustrative embodiments recognize and take into account that it would be desirable to have a method, an apparatus, and a computer program product that overcome a technical problem with managing sessions for a user accessing a web application with multiple tenants.

Thus, the illustrative embodiments provide a method, apparatus, and computer program product for managing access to a web application. The web application supports multi-tenancy for multiple users. In one illustrative example, a computer system receives a request, including a tenant identifier, for a tenant within a universal resource locator for the web application on a server in the computer system from a browser. The computer system receives a set of session cookies for the web application from the browser. The set of session cookies have tenant identifiers and session identifiers. The computer system selects a session cookie in the set of session cookies corresponding to the tenant identifier within the universal resource locator as a selected session cookie when the session cookie corresponding to the tenant identifier is present in the set of cookies. The computer system uses the selected session cookie to handle the request. As used herein, "a set of," when used with reference to items, means one or more items. For example, "a set of session cookies" is one or more session cookies.

With reference now to the figures and, in particular, with reference to FIG. 1, a block diagram of a web application environment is depicted in accordance with an illustrative embodiment. As depicted, web application environment 100 includes web application system 102, which comprises web application 104 and computer system 106.

Computer system 106 is a physical hardware system that includes one or more data processing systems. When more than one data processing system is present, those data processing systems are in communication with each other using a communications medium. The communications medium may be a network. The data processing systems may be selected from at least one of a computer, a server computer, a tablet, a workstation, or some other suitable data processing system.

As depicted, web application 104 runs on computer system 106 and is a computer program that utilizes web browsers and other web technology to perform tasks over a network, such as the Internet. In this illustrative example, web application 104 is a client-side portion of the application that typically includes a user interface and client-side logic. In this example, the user interface and client-side logic runs in the web browser on a client data processing system. The server-side portion of web application 104 provides functionality to perform actions in response to requests from the client-side portion of web application 104 running in the browser.

In this illustrative example, web application 104 supports access using multiple tenants by multiple users. For example, web application 104 provides access to users 108 and supports tenants 110. A tenant is a group of users 108 that share a common access with specific privileges for the instance of web application 104. Each tenant in tenants 110 has a dedicated share of the instance of web application 104. This dedicated share includes, for example, data, configuration, user management, functionality, and other suitable properties.

In this illustrative example, user 112 in users 108 can interact with web application 104 from data processing system 114 that is in communication with computer system 106 over network 116. As depicted, data processing system 114 may take a number of different forms. For example, data processing system 114 can be selected from one of a computer, a server computer, a workstation, a tablet computer, a laptop computer, a game console, a mobile phone, or some other suitable type of data processing system. Network 116 can include at least one of a local area network (LAN), a wide area network (WAN), an intranet, the Internet, or some other suitable type of network.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, web application 104 receives request 118, including tenant identifier 120 for tenant 122 in tenants 110 within universal resource locator 124 for web application 104 on server in computer system 106 from browser 128 over network 116. Web application 104 receives a set of session cookies 130 for web application 104 from browser 128. The set of session cookies 130 are a set of cookies that have tenant identifiers 132 and session identifiers 134. In this illustrative example, browser 128 is a software application for presenting and traversing information resources such as those on the World Wide Web. Browser 128 can also be used to access information provided by Web servers on private networks and/or files in file systems.

Web application 104 selects session cookie 136 in the set of session cookies 130 in which session cookie 136 corresponds to tenant identifier 120 within universal resource locator 124 as selected session cookie 140. This selection is made when session cookie 136, corresponding to tenant identifier 120, is present in the set of session cookies 130. Web application 104 uses selected session cookie 140 to handle request 118. Session cookie 136 is a cookie that contains an identification of a session for web application 104. Session cookie 136 may also include other information.

Web application 104 can be implemented in software, hardware, firmware, or a combination thereof. When software is used, the operations performed by web application 104 can be implemented in program code configured to run on hardware, such as a processor unit. When firmware is used, the operations performed by web application 104 may be implemented in program code and data and stored in persistent memory to run on a processor unit. When hardware is employed, the hardware may include circuits that operate to perform the operations in web application 104.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components. For example, the processes may be implemented as circuits in organic semiconductors.

In one illustrative example, one or more technical solutions are present that overcome a technical problem with managing sessions for a user accessing a web application with multiple tenants. As a result, one or more technical solutions may provide a technical effect of enabling a user that belongs to multiple tenants to interact with web application 104 using multiple tenants in parallel without having the user login again for every context switch to different tenants.

As a result, computer system 106 operates as a special purpose computer system in which web application 104 in computer system 106 enables users 108 that belong to multiple tenants for web application 104. In particular, web application 104 transforms computer system 106 into a special purpose computer system, as compared to currently available general computer systems that do not have web application 104.

Figure 2:
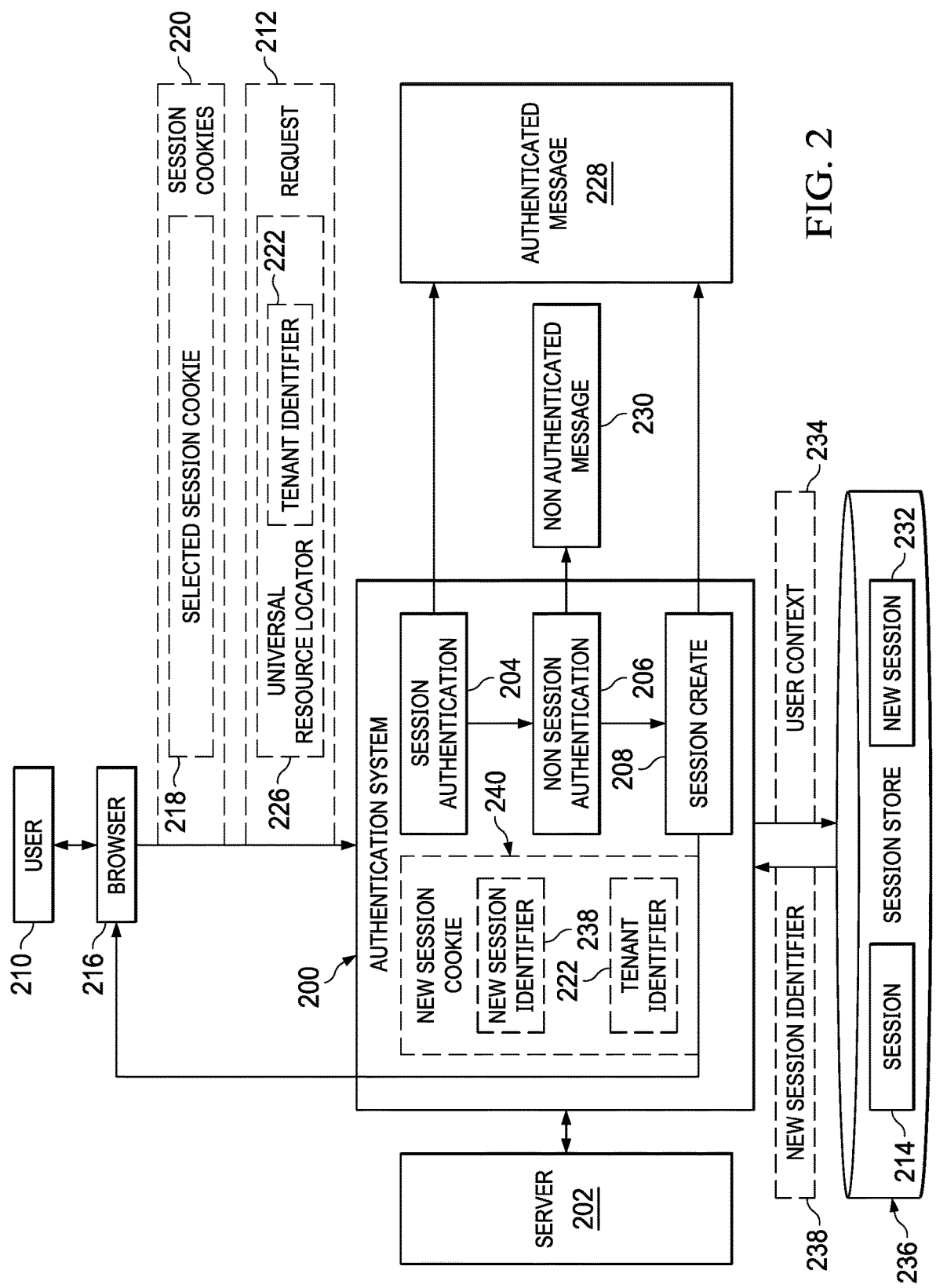
FIG. 2 is a block diagram of an authentication system in accordance with illustrative embodiment.

With reference next to FIG. 2, a block diagram of an authentication system is depicted in accordance with an illustrative embodiment. In this illustrative example, authentication system 200 can be implemented within web application 104 in FIG. 1. In this illustrative example, authentication system 200 is implemented in server 202 portion of web application 104.

In this illustrative example, authentication system 200 has a number of different components. As depicted, authentication system 200 comprises session authentication 204, non-session authentication 206, and session create 208.

Session authentication 204 is configured to determine the authentication state of user 112 when request 118 is received for session 214 from user 210 via browser 216. User 210 is an example of user 112. As depicted, session 214 is identified utilizing selected session cookie 218 in a set of session cookies 220 also received from browser 216. Selected session cookie 218 is identified using tenant identifier 222 for a tenant in universal resource locator 226 in request 212.

In this illustrative example, session authentication 204 is configured to check session 214 for user 210 when request 212 is received from browser 216. If user 210 is authenticated, authenticated message 228 is generated by session authentication 204. Other components in web application 104 may perform actions or functions based on request 212 when this message is generated.

If user 210 cannot be authenticated via session 214, other authentication mechanisms may be utilized in non-session authentication 206. For example, non-session authentication 206 may use a login process, a single sign-on process, a registration process, or some other suitable process for attempting to authenticate user 210.

If user 210 still cannot be authenticated, non-session authentication 206 returns non-authenticated message 230. This message indicates that a valid session is not present. On the other hand, if user 210 can be authenticated, new session 232 is created through session create 208. Session create 208 stores user context 234 to session store 236. In this illustrative example, session store 236 is a component that stores information about the session. This information includes information about the state of the session. For example, session store 236 may store information about what actions have been taken by the user thus far.

Additionally, session create 208 receives new session identifier 238 from session store 236. This session identifier is used to create new session cookie 240. New session cookie 240 includes new session identifier 238 as well as tenant identifier 222. New session cookie 240 is then returned to browser 216. Additionally, session create 208 also generates authenticated message 228.

The illustration of web application environment 100 and the different components in this environment in FIG. 1 and FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although only user 112 is shown accessing web application 104 in FIG. 1, other users in users 108 also may access one or more tenants and tenants 110 for web application 104. Further, computer system 106 may host one or more web applications in addition to web application 104 that support multiple tenants for multiple users. As another example, browser 128 and web application 104 can be located on the same data processing system.

Figure 3:
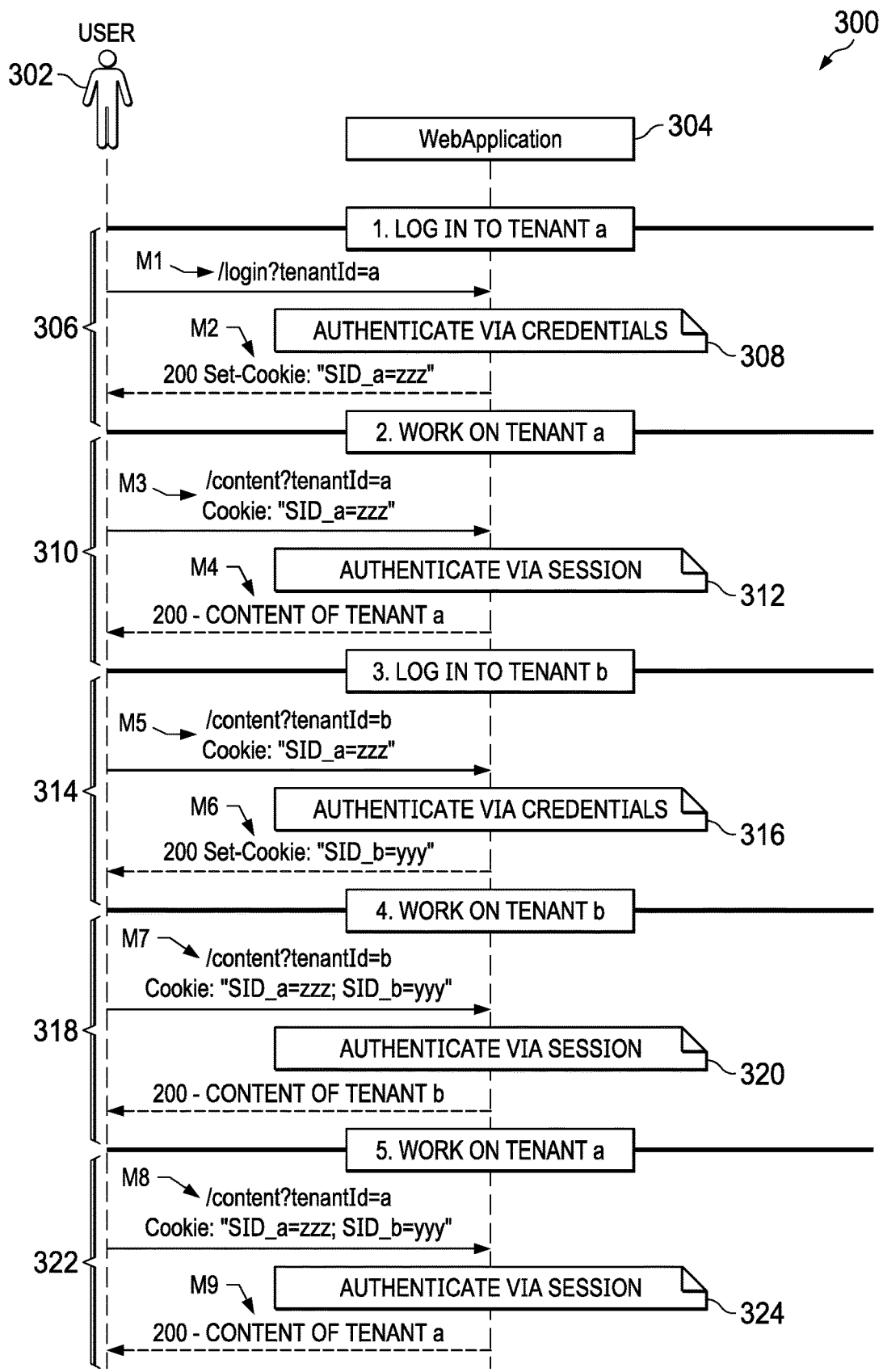
FIG. 3 is a sequence diagram for accessing a web application in accordance with an illustrative embodiment.

With reference next to FIG. 3, a sequence diagram for accessing a web application is depicted in accordance with an illustrative embodiment. As depicted, sequence diagram 300 illustrates interactions between user 302 and web application 304. The interaction between these two components is facilitated by a browser operated by user 302. User 302 is an example of a user in users 108 in FIG. 1. Web application 304 is an example of web application 104 in FIG. 1.

In section 306, user 302 logs into Tenant A in web application 304 by sending a login request (message m1). This login request in message m1 is a universal resource locator as follows: "/login?tenanatid=a" includes the tenant identifier "a" for Tenant A as a parameter in the universal resource locator. In the illustrative example, the tenant identifier is included as a query parameter in universal resource locator. In response, web application 304 authenticates via credentials (step 308). The authentication in this step can be performed by non-session authentication 206 in FIG. 2 using, for example, a single sign-on, a two-factor authentication, or some other type of access control mechanism.

Web application 304 returns a session cookie containing the session ID to user 302 (message m2). In this example, message m2 is as follows: "Set-Cookie: 'SID_a=zzz'" with "SID_a" being the name of the cookie that includes the tenant identifier. The value of the cookie, "zzz," is the session identifier.

Next, in section 310, user 302 works on Tenant A. In this section, user 302 interacts with web application 304 using the session cookie for Tenant A (message m3). Message m3 reads as follows: /content?tenantid=a; Cookie: "SID_a=zzz." In this example, a request for content is made in the universal resource locator that also includes the tenant identifier "a" for Tenant A. User 302 also sends the cookie for Tenant A.

Responding to receiving the request and the cookie, web application 304 performs authentication via session (step 312). This authentication may be performed by session authentication 204 in FIG. 2. Web application 304 returns a response for content in Tenant A (message m4).

Next, in section 314, user 302 logs into Tenant B. User 302 sends a login request and a set of session cookies (message m5). In this example, a session cookie for Tenant B is not present. In the illustrative example, web application 304 performs authentication via credentials (step 316). This type of authentication is performed because the cookie for the session for Tenant B identified in the request for the session is not present. The cookie for Tenant A is not used because the tenant identifier in the universal resource locator is for Tenant B.

In response to authentication of user 302 for Tenant B, web application 304 creates a new session cookie for Tenant B. Web application 304 returns the session cookie to user 302 (message m6). In this example, the response reads as follows: Set Cookie: 'SID_b=yyy,'" where the cookie name is SID_b including the tenant identifier "b" and the cookie value is "yyy" which is the session identifier.

In section 318, user 302 interacts with Tenant B for web application 304 by sending a request to web application 304 (message m7). In this example, the request sent in message m7 includes a request for content in Tenant B and a set of cookies. As depicted, the set of session cookies comprises "SID_a=zzz" and "SID_b=yyy." As depicted, web application 304 performs authentication via session (step 320). This step is performed using session authentication 204 in FIG. 2. As depicted, all of the session cookies for web application 304 are sent to web application 304.

Web application 304 identifies the tenant identifier "a" from the request in message m5. In this example, the tenant identifier is a parameter "tenant ID=a". With the tenant identifier, web application 304 performs authentication in step 320 using the cookie for Tenant B, "SID_b=yyy", which includes identification of the tenant in the cookie name.

Next, in section 322, user 302 works on Tenant A. In this example, user 302 sends a request to web application 304 (message m8). This message includes "/content?tenantid=a." The request also includes sending the set of session cookies, "SID_a=zzz" and "SID_b=yyy."

As depicted, web application 304 authenticates via session (step 324). This step is performed using the session cookie "SID_a=zzz." This session cookie is selected from the set of session cookies using the tenant identifier "a" in the universal resource locator. In response, web application 304 returns content for Tenant A to user 302 (message m9).

The illustration of sequence diagram 300 in FIG. 3 is presented for purposes of providing an example of one manner in which a user may interact with multiple tenants supported by a web application. This illustration is not meant to limit the manner in which other illustrative examples may be implemented. For example, user 302 can interact with other tenants in addition to Tenant A and Tenant B as illustrated in sequence diagram 300. As another example, sessions may expire requiring replication which may be handled by web application 304 in the same manner that web application 304 handles initial login to a tenant.

Figure 4:
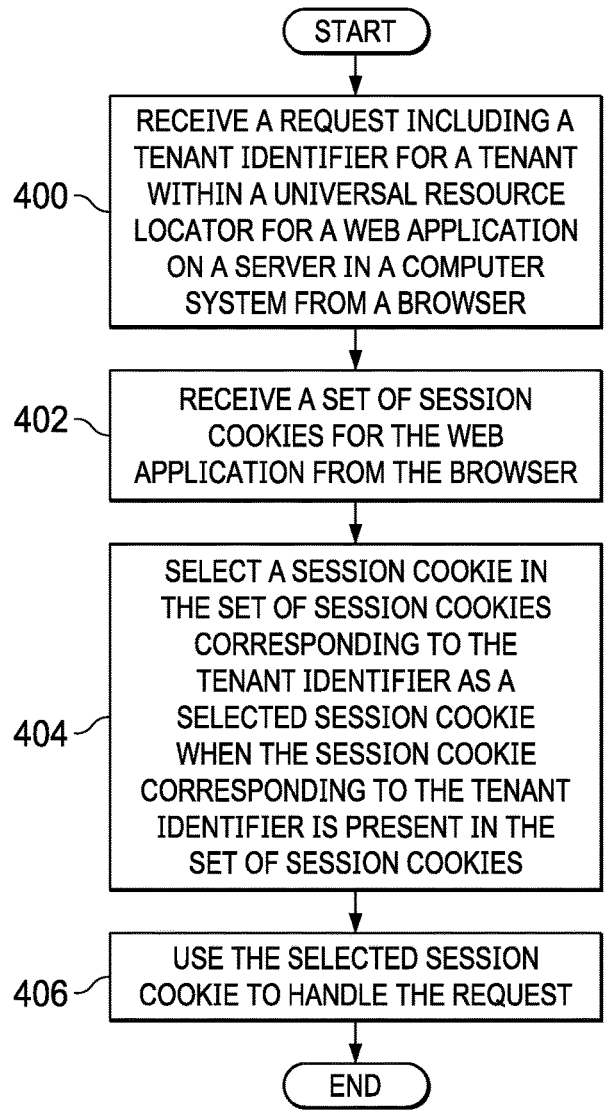
FIG. 4 is a flowchart of a process for managing access to a web application in accordance with an illustrative embodiment.

Turning next to FIG. 4, a flowchart of a process for managing access to a web application is depicted in accordance with an illustrative embodiment. The process illustrated in FIG. 4 can be implemented in program code, hardware, or combination thereof. When implemented in program code, the program code can be run by a processor unit in a computer system to perform the different steps. As depicted, the process in FIG. 4 can be implemented in a web application such as web application 104 running on computer system 106 in FIG. 1.

The process begins by receiving a request including a tenant identifier for a tenant within a universal resource locator for a web application on a server in a computer system from a browser (step 400). The process receives a set of session cookies for the web application from the browser (step 402). The set of session cookies have tenant identifiers and session identifiers. In other words, each session cookie in the set of session cookies includes a tenant identifier and the session identifier. In one illustrative example, the cookie name for the selected session cookie includes the tenant identifier, and the selected session cookie contains a session identifier for the tenant.

The process selects a session cookie in the set of session cookies corresponding to the tenant identifier as a selected session cookie when the session cookie corresponding to the tenant identifier is present in the set of session cookies (step 404). The process uses the selected session cookie to handle the request (step 406). The process terminates thereafter.

The handling of the request may include at least one of returning content identified in the request, searching a database for information responsive to the request, or performing some other suitable action. The process in FIG. 4 may be repeated each time the request is received from the user.

Figure 5:
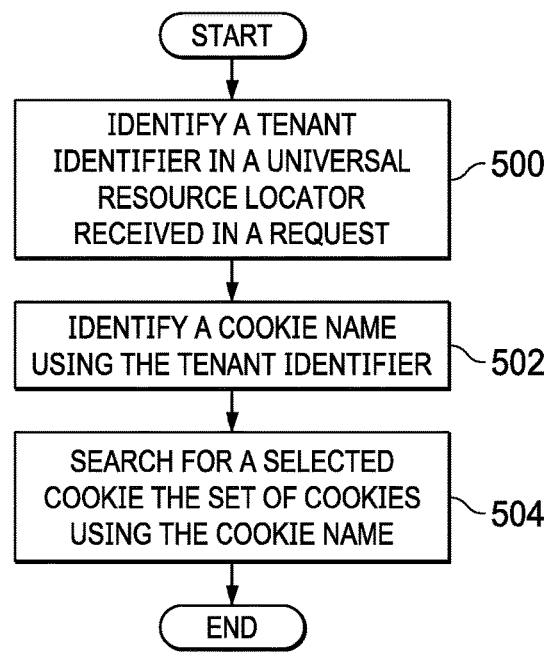
FIG. 5 is a flowchart of a process for selecting a session cookie in a set of session cookies in accordance with an illustrative embodiment.

Turning to FIG. 5, a flowchart or process for selecting the session cookie in the set of session cookies is depicted in accordance with an illustrative embodiment. The process illustrated in FIG. 5 is an example of an implementation for step 404 in FIG. 4.

The process begins by identifying a tenant identifier in a universal resource locator received in a request (step 500). The process identifies a cookie name using the tenant identifier (step 502). The process searches for a selected cookie the set of cookies using the cookie name (step 504). The process terminates thereafter.

Figure 6:
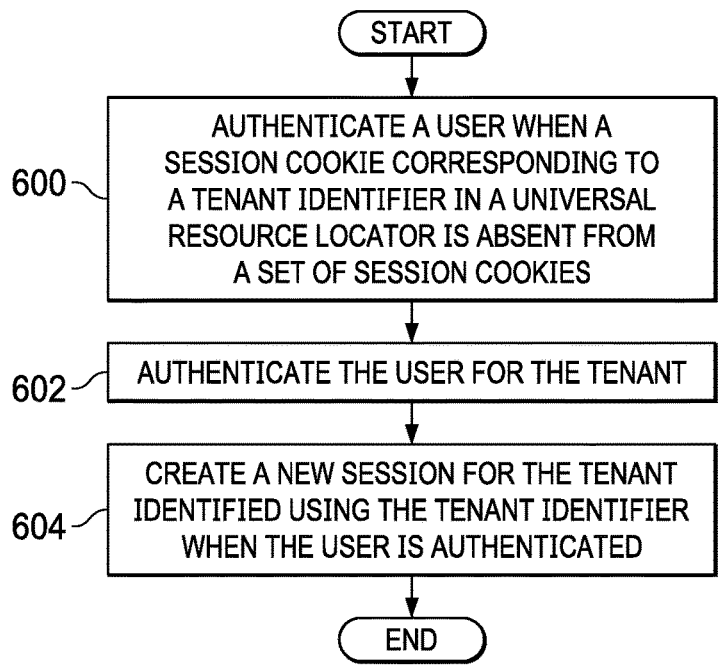
FIG. 6 is a flowchart of a process for handling a request in accordance with an illustrative embodiment.

With reference now to FIG. 6, a flowchart of a process for handling a request is depicted in accordance with an illustrative embodiment. The process illustrated in FIG. 5 is an example of one implementation for step 406 in FIG. 4.

The process begins by authenticating a user when a session cookie corresponding to a tenant identifier in a universal resource locator is absent from a set of session cookies (step 600). The process authenticates the user for the tenant (step 602). The process creates a new session for the tenant identified using the tenant identifier when the user is authenticated (step 604). The process terminates thereafter.

Figure 7:
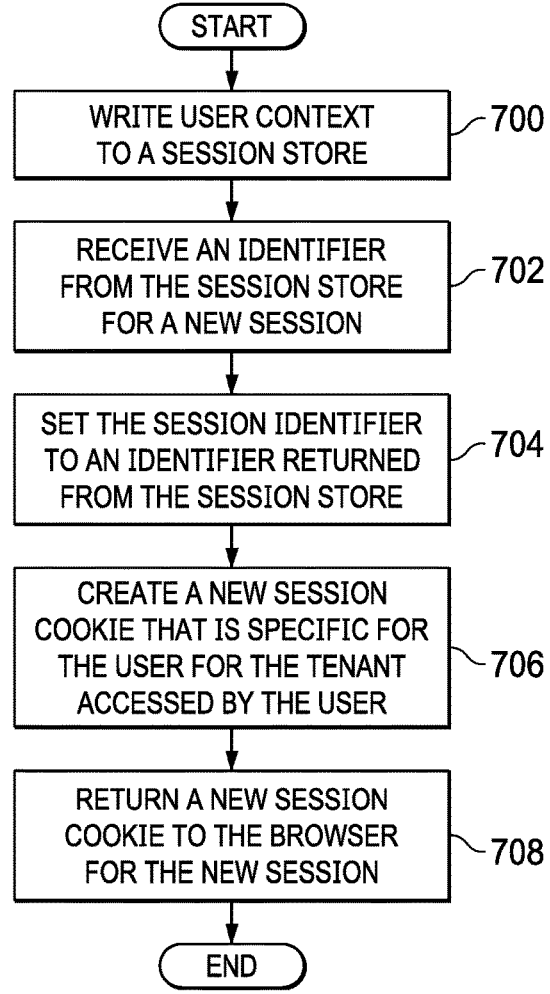
FIG. 7 is a flowchart of a process for creating a new session in accordance with an illustrative embodiment.

With reference to FIG. 7, a flowchart of a process for creating a new session is depicted in accordance with an illustrative embodiment. The process illustrated in FIG. 7 is an example of an implementation for step 604 in FIG. 6.

The process begins by writing user context to a session store (step 700). The process receives an identifier from the session store for a new session (step 702). The process sets the session identifier to an identifier returned from the session store (step 704).

The process creates a new session cookie that is specific for the user for the tenant accessed by the user (step 706). The process returns a new session cookie to the browser for the new session (step 708). The process terminates thereafter. The new session cookie is added to the set of session cookies for the web application by the browser that receives the new session cookie.

Figure 8:
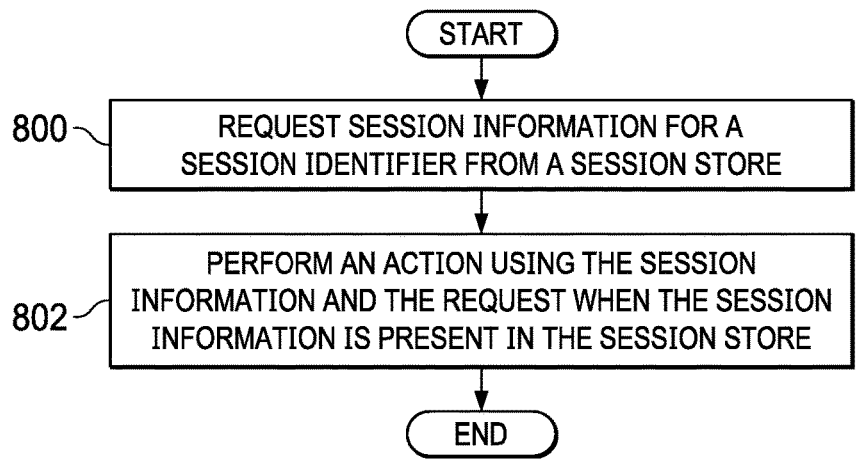
FIG. 8 is a flowchart of a process for handling a request using a selected session cookie in accordance with an illustrative embodiment.

With reference to FIG. 8, a flowchart of a process for handling a request using a selected session cookie is depicted in accordance with an illustrative embodiment. The process illustrated in FIG. 8 is an example of one implementation for step 406 in FIG. 4.

The process begins by requesting session information for a session identifier from a session store (step 800). The session identifier is identified in a selected session cookie. The process performs an action using the session information and the request when the session information is present in the session store (step 802). In this illustrative example, a valid session is absent when the session information is absent from the session store. The process terminates thereafter. The action may take a number of different forms. For example, the action can be selected from one of returning a webpage, returning content, returning a spreadsheet, performing a calculation, initiating a query on the database, or some other suitable type of action.

Figure 9:
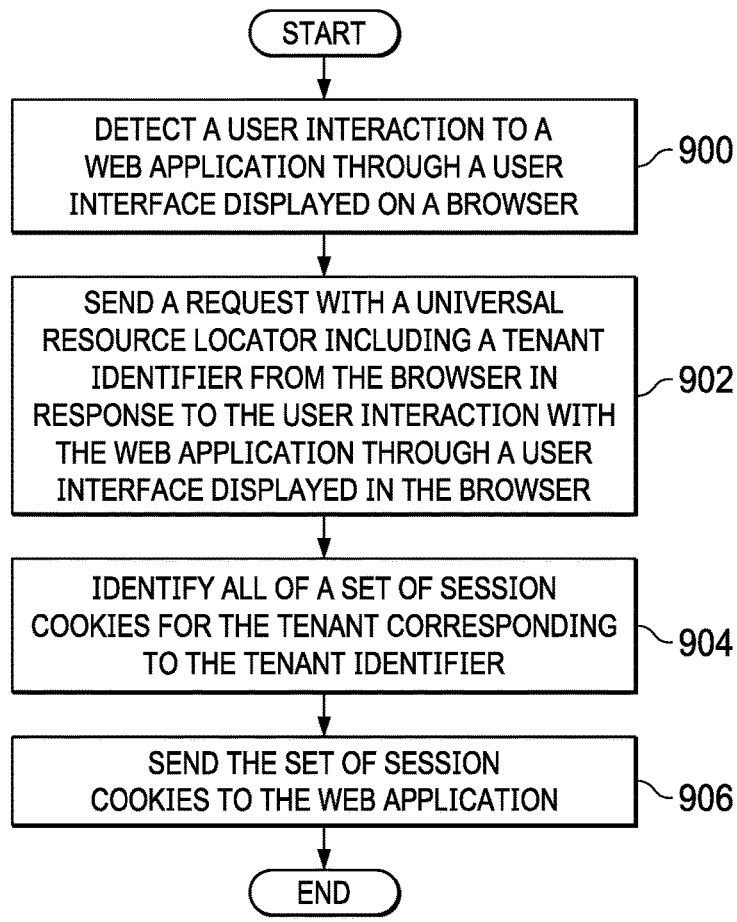
FIG. 9 is a flowchart of a process for generating a request in a tenant in accordance with an illustrative embodiment.

Turning to FIG. 9, a flowchart of a process for generating a request in a tenant is depicted in accordance with an illustrative embodiment. The process illustrated in FIG. 9 can be performed using browser 128 in FIG. 1.

The process begins by detecting a user interaction to a web application through a user interface displayed on a browser (step 900). The process sends a request with a universal resource locator including a tenant identifier from the browser in response to the user interaction with the web application through a user interface displayed in the browser (step 902). The process identifies all of a set of session cookies for the tenant corresponding to the tenant identifier (step 904). The process sends the set of session cookies to the web application (step 906). The process terminates thereafter.

Figure 10:
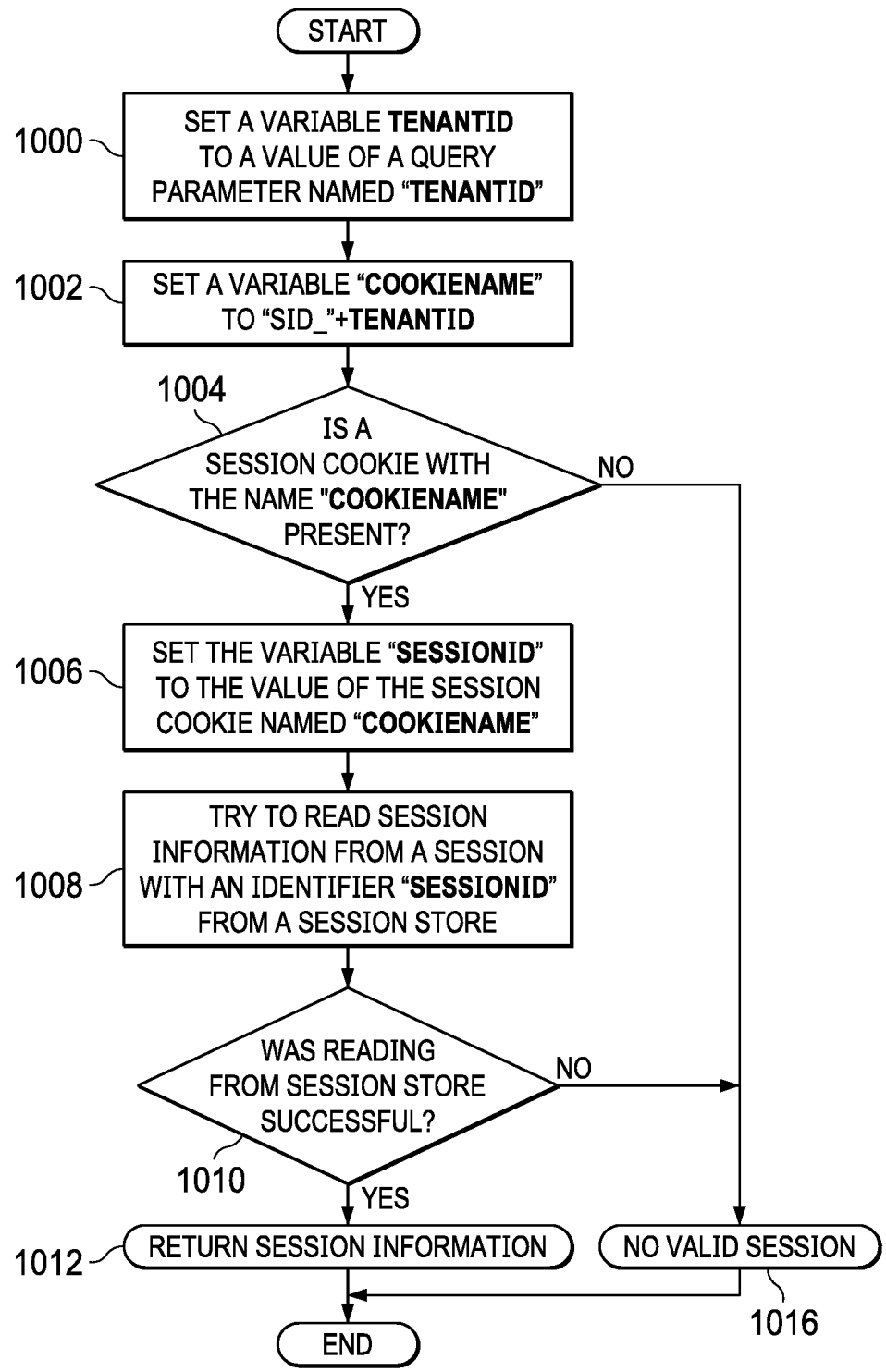
FIG. 10 is a flowchart of an authorization process in accordance with an illustrative embodiment.

With reference next to FIG. 10, a flowchart of an authorization process is depicted in accordance with an illustrative embodiment. The process illustrated in FIG. 10 can be implemented in program code, hardware, or combination thereof. When implemented in program code, the program code can be run by a processor unit in a computer system to perform the different steps. As depicted, the process in FIG. 10 can be implemented in a web application such as web application 104 running on computer system 106 in FIG. 1. For example, this process can be implemented in session authentication 204 in authentication system 200 in web application 104 as depicted in FIG. 2.

The process begins by setting a variable "tenantid" to a value of a query parameter named "tenantid" (step 1000). This query parameter is found in a query received from a browser and identifies a tenant for the query. The process sets a variable "cookieName" to SID_"+tenantid (step 1002). This variable identifies the name of the session cookie for the tenant identifier. As used in FIG. 10 and FIG. 11, the symbol "+" indicates a concatenation of strings.

A determination is made as to whether a session cookie with the name "cookieName" is present (step 1004). This determination is made by searching a set of session cookies also received from the browser in conjunction with the request containing the query from which the tenant identifier was identified.

If the session cookie is present, the process sets the variable "sessionid" to the value of the session cookie named "cookieName" (step 1006). The process attempts to read session information from a session with an identifier "sessionid" from a session store (step 1008). A determination is made as to whether the attempt to read the session information from the session store was successful (step 1010). If the attempt was successful, the process returns the session information (step 1012) with the process terminating thereafter.

Otherwise, the process generates a message that indicates no valid session is present (step 1016). The process terminates thereafter. With reference again to step 1004, if a cookie with the name "cookieName" is not present, the process also proceeds to step 1016.

Figure 11:
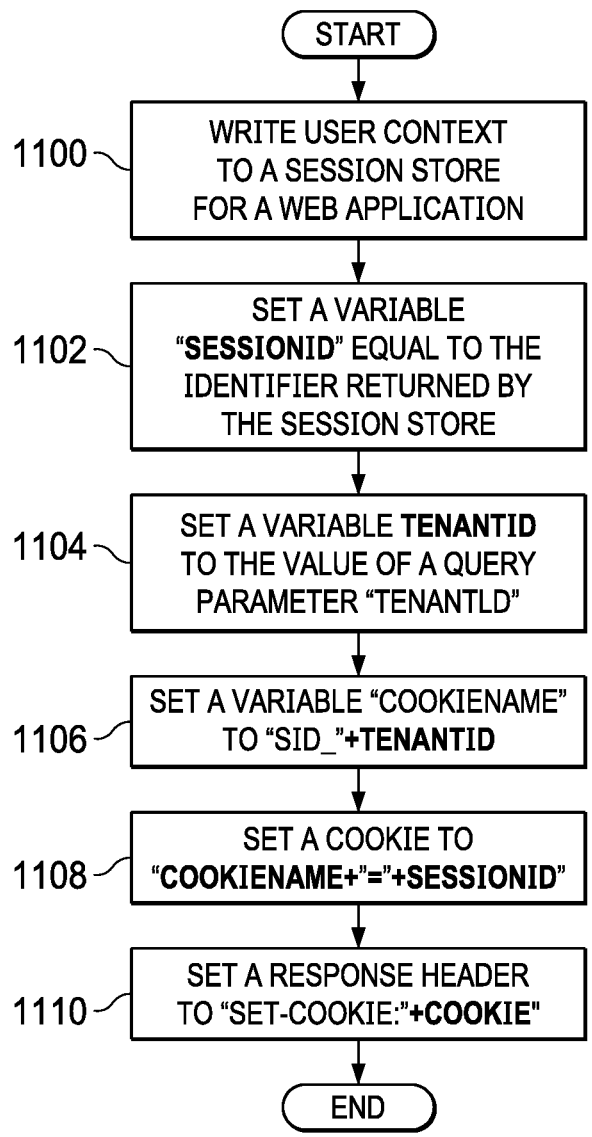
FIG. 11 is a flowchart of a session create process in accordance with an illustrative embodiment.

With reference next to FIG. 11, a flowchart of a session create process is depicted in accordance with an illustrative embodiment. The process illustrated in FIG. 10 can be implemented in program code, hardware, or combination thereof. When implemented in program code, the program code can be run by a processor unit in a computer system to perform the different steps. As depicted, the process in FIG. 11 can be implemented in a web application such as web application 104 running on computer system 106 in FIG. 1. For example, this process can be implemented in session create 208 in authentication system 200 in web application 104 as depicted in FIG. 2.

The process begins by writing user context to a session store for a web application (step 1100). The process sets a variable "sessionid" equal to the identifier returned by the session store (step 1102).

The process then sets a variable "tenantid" to the value of a query parameter "tenantid" (step 1104). This query parameter is located in the universal resource locator received in the request to interact with the web application for a particular tenant identified by the query parameter. The process sets a variable "cookieName" to "SID_"+tenantid (step 1106). Step 1106 is used to set the cookie name based on the tenant identifier obtained from the query parameter. The process then sets a cookie to cookieName+"="+sessionid (step 1108). Step 1106 is used to set the cookie name based on the tenant identifier obtained from the query parameter. The new cookie name is then used when defining the session cookie in step 1108.

The process then sets a response header to "Set-Cookie: "+cookie (step 1110). The process terminates thereafter. The response header is used to return the cookie to the browser in a response header.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
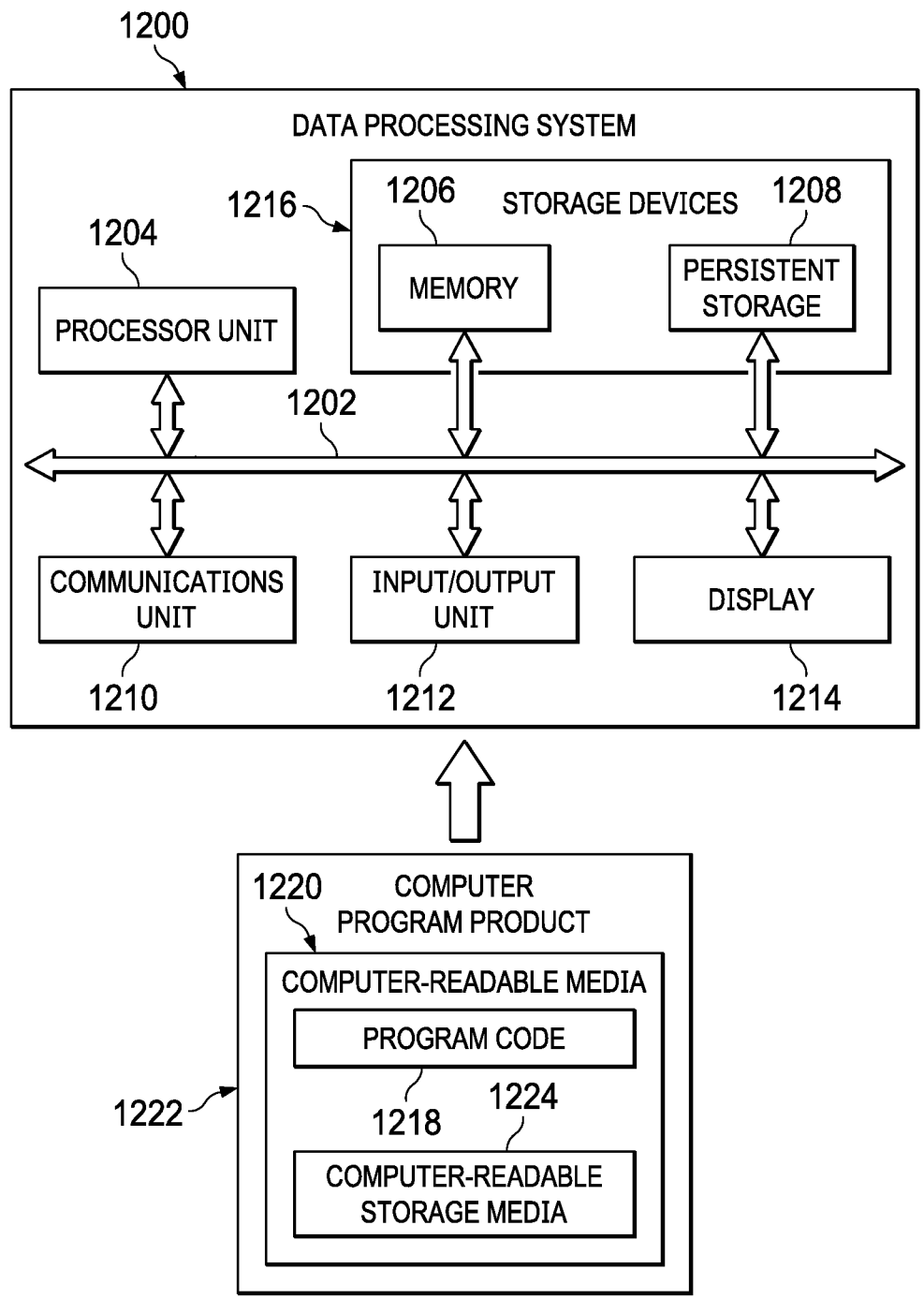
FIG. 12 is a block diagram of a data processing system in accordance with an illustrative embodiment.

Turning now to FIG. 12, a block diagram of a data processing system is depicted in accordance with an illustrative embodiment. Data processing system 1200 may be used to implement at least one of computer system 106 or data processing system 114 of FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 is computer-readable storage media 1224. In these illustrative examples, computer-readable storage media 1224 is a physical or tangible storage device used to store program code 1218 rather than a medium that propagates or transmits program code 1218.

Alternatively, program code 1218 may be transferred to data processing system 1200 using a computer-readable signal media. The computer-readable signal media may be, for example, a propagated data signal containing program code 1218. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Thus, one or more technical solutions are present that overcome a technical problem with managing sessions for a user accessing a web application with multiple tenants. As a result, one or more technical solutions may provide a technical effect of enabling a user that belongs to multiple tenants to interact with the web application using the multiple tenants in parallel without having the user login again for every context switch to different tenants.

In the illustrative example, a computer-implemented method, a computer system, and a computer program product are present for managing access to a web application. The illustrative examples as described above enables a user to utilize sessions from multiple tenants at the same time while not restricting each session to a single tab. The illustrative examples do not require additional effort from a user and avoids including sensitive information in a universal resource locator. In this manner, universal resource locators can be shared between users of the same tenant without revealing sensitive data in the universal resource locators. Further, the number of logins required can be reduced because users do not need to logout to switch to a different tenant. Currently valid sessions are reused rather than requiring a login with the illustrative examples.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing access to a web application, the method comprising:
    first receiving, by a computer system, a login request including a tenant identifier for a tenant within a universal resource locator for the web application on a server in the computer system from a browser;
    second receiving, by the computer system, a set of session cookies for the web application from the browser, wherein:
        each session cookie of the set of session cookies has a tenant identifier and a session identifier; and
        the first receiving and the second receiving comprise receiving a same message;
    selecting, by the computer system, a session cookie in the set of session cookies corresponding to the tenant identifier within the universal resource locator as a selected session cookie when the session cookie corresponding to the tenant identifier is present in the set of session cookies; and
    using, by the computer system, the selected session cookie to handle the login request.

2. The method of claim 1, wherein handling the login request comprises:
    authenticating a user when the session cookie corresponding to the tenant identifier in the universal resource locator is absent from the set of session cookies;
    authenticating the user for the tenant; and
    creating a new session for the tenant identified using the tenant identifier when the user is authenticated.

3. The method of claim 2, wherein creating the new session for the tenant identifier using the tenant identifier when the user is authenticated comprises:
    writing user context to a session store;
    setting a session identifier to an identifier returned from the session store;
    creating a new session cookie using the session identifier that is specific for the user for the tenant accessed by the user; and
    returning the new session cookie to the browser, wherein the new session cookie is added to the set of session cookies for the web application.

4. The method of claim 1, wherein selecting the session cookie in the set of session cookies corresponding to the tenant identifier within the universal resource locator as the selected session cookie when the session cookie corresponding to the tenant identifier is present in the set of session cookies comprises:
    identifying the tenant identifier in the universal resource locator received in the login request;
    identifying a session cookie name using the tenant identifier; and
    searching for the selected session cookie using the session cookie name.

5. The method of claim 4, wherein the session cookie name includes the tenant identifier; and wherein the selected session cookie contains a session identifier for the tenant.

6. The method of claim 1, wherein using the selected session cookie to handle the login request comprises:
    requesting session information for a session identifier from a session store, wherein the session identifier is identified in the selected session cookie; and
    performing an action using the session information and the request when the session information is present in the session store.

7. The method of claim 6, wherein a valid session is absent when the session information is absent from the session store.

8. The method of claim 1 further comprising:
    sending the login request with the universal resource locator including the tenant identifier from the browser in response to a user interaction with the web application through a user interface displayed in the browser;
    identifying all of the set of session cookies for the tenant corresponding to the tenant identifier; and
    sending the set of session cookies to the web application.

9. A web application system comprising:
    a computer system;
    a web application running on the computer system, wherein the web application:
        receives a request including a tenant identifier for a tenant within a universal resource locator for the web application on a server in the computer system from a browser over a network;
        receives a set of session cookies for the web application from the browser, wherein:
            each session cookie of the set of session cookies has a tenant identifier and a session identifier; and
            reception of the request and the set of session cookies occurs in a same message;
        selects a session cookie in the set of session cookies corresponding to the tenant identifier within the universal resource locator as a selected session cookie when the session cookie corresponding to the tenant identifier is present in the set of session cookies; and uses the selected session cookie to handle the request.

10. The web application system of claim 9, wherein in authenticating a user when the session cookie corresponding to the tenant identifier in the universal resource locator is absent from the set of session cookies, the web application authenticates the user for the tenant; and creates a new session for the tenant identified using the tenant identifier when the user is authenticated.

11. The web application system of claim 10, wherein in creating the new session for the tenant identifier using the tenant identifier when the user is authenticated, the web application writes user context to a session store; sets a session identifier to an identifier returned from the session store; creates a new session cookie using the session identifier that is specific for the user for the tenant accessed by the user; and returns a new session cookie to the browser, wherein the new session cookie is added to the set of session cookies for the web application.

12. The web application system of claim 9, wherein in selecting the session cookie in the set of session cookies corresponding to the tenant identifier within the universal resource locator as the selected session cookie when the session cookie corresponding to the tenant identifier is present in the set of session cookies, the web application identifies the tenant identifier in the universal resource locator received in the request; identifies a session cookie name using the tenant identifier; and searches for the selected session cookie using the session cookie name.

13. The web application system of claim 12, wherein the session cookie name includes the tenant identifier, and wherein the selected session cookie contains a session identifier for the tenant.

14. The web application system of claim 9, wherein in using the selected session cookie to handle the request, the web application requests session information for a session identifier from a session store, wherein the session identifier is identified in the selected session cookie and performs an action using the session information and the request when the session information is present in the session store.

15. The web application system of claim 14, wherein a valid session is absent when the session information is absent from the session store.

16. A computer program product comprising:
a computer readable storage medium including instructions for managing access to a web application, the instructions comprising:
first program code for receiving a request including a tenant identifier for a tenant within a universal resource locator for the web application on a server in a computer system from a browser, and for receiving a set of session cookies for the web application from the browser, wherein:
each session cookie of the set of session cookies has a tenant identifier and a session identifier; and
the request is received with the set of session cookies in a same message;
second program code for selecting a session cookie in the set of session cookies corresponding to the tenant identifier within the universal resource locator as a selected session cookie when the session cookie corresponding to the tenant identifier is present in the set of session cookies; and
third program code for using the selected session cookie to handle the request.

17. The computer program product of claim 16, wherein the instructions further comprise:
fourth program code for authenticating a user when the session cookie corresponding to the tenant identifier in the universal resource locator is absent from the set of session cookies;
fifth program code for authenticating the user for the tenant; and
sixth program code for creating a new session for the tenant identified using the tenant identifier when the user is authenticated.

18. The computer program product of claim 17, wherein the seventh sixth program code comprises:
seventh program code for writing user context to a session store;
eighth program code for setting a session identifier to an identifier returned from the session store;
ninth program code for creating a new session cookie using the session identifier that is specific for the user for the tenant accessed by the user; and
tenth program code for returning the new session cookie to the browser, wherein the new session cookie is added to the set of session cookies for the web application.

19. The computer program product of claim 16, wherein the second program code comprises:
fourth program code for identifying the tenant identifier in the universal resource locator received in the request;
fifth program code for identifying a session cookie name using the tenant identifier; and
sixth program code for searching for the selected session cookie using the session cookie name.

20. The computer program product of claim 16, wherein the third program code comprises:
fourth program code for requesting session information for a session identifier from a session store, wherein a session identifier is identified in the selected session cookie; and
fifth program code for performing an action using the session information and the request when the session information is present in the session store.

* * * * *